United States Patent [19]
Curtis et al.

[11] Patent Number: 5,233,576
[45] Date of Patent: Aug. 3, 1993

[54] MULTI-FUNCTION OPTICAL DISK DRIVE AND MEDIA

[75] Inventors: Hoyle L. Curtis; Terry L. Loseke, both of Loveland, Colo.

[73] Assignee: Hewlett-Packard Company, Palo Alto, Calif.

[21] Appl. No.: 795,226

[22] Filed: Nov. 15, 1991

Related U.S. Application Data

[63] Continuation of Ser. No. 426,834, Oct. 25, 1989, abandoned.

[51] Int. Cl.$^5$ ............................................. G11B 20/12
[52] U.S. Cl. .................................. 369/13; 369/44.33; 369/53; 369/275.2
[58] Field of Search ...................... 369/13, 275.1, 275.2, 369/48, 49, 54, 58, 59, 51, 52, 53, 44.33

[56] References Cited

U.S. PATENT DOCUMENTS

| | | | |
|---|---|---|---|
| 4,606,016 | 8/1986 | Verboom et al. | 369/54 |
| 4,689,778 | 8/1987 | Miura et al. | 369/54 |
| 4,760,566 | 6/1988 | Kobayashi et al. | 369/48 |
| 4,831,611 | 5/1989 | Sasaki et al. | 369/54 |
| 4,932,014 | 6/1990 | Tamiya | 369/48 |
| 4,937,804 | 6/1990 | Ishihara | 369/48 |
| 4,949,326 | 8/1990 | Takagi et al. | 369/54 |
| 5,023,854 | 6/1991 | Satoh et al. | 369/58 |
| 5,060,218 | 6/1991 | Chiyomatsu | 369/54 |

FOREIGN PATENT DOCUMENTS

| | | |
|---|---|---|
| 0216704 | 4/1987 | European Pat. Off. |
| 0227530 | 7/1987 | European Pat. Off. |
| 0232134 | 8/1987 | European Pat. Off. |
| 59-28218 | 2/1984 | Japan |
| 59-146446 | 8/1984 | Japan |

OTHER PUBLICATIONS

Microsoft MS-DOS User's Guide—Microsoft Corporation 1987—pp. 33-34.
Optical Memory News, Jul., 1989, p. 18.

Primary Examiner—Eugene R. LaRoche
Assistant Examiner—Tan Nguyen

[57] ABSTRACT

Disclosed is an apparatus and method for defining magneto-optical disk media and an optical data storage device that allows the media to be convertible from writable to read-only. The media has a media descriptor table contained within a control track which is modified to define the media as a new media type. Previously manufactured drives will not recognize the media type, and therefore, will not read or write the media, so the data on the media is protected from being destroyed by such drives. The invention also defines a storage state bit within each sector of each track of the media, that defines whether the sector is writable or read-only. With this bit set into the writable state, the sector can be written many times. Once the bit is changed to read-only, however, the sector can no longer be written. The data storage device of the invention will not reset the bit, once it is set to the read-only state. The invention defines two locations for the storage state bit. In one embodiment of the invention the storage state bit is located in the sector mark field area of each sector, prior to the data portion of the sector. In a second embodiment of the invention, the storage state bit is placed in the data field area of each sector. Using the above described apparatus and method, the invention provides the same level of security as current WORM drives.

10 Claims, 5 Drawing Sheets

MULTI-FUNCTION OPTICAL DISK DRIVE AND MEDIA

CROSS REFERENCE TO RELATED APPLICATION

This is a continuation of copending application Ser. No. 07/426,834 filed on 10/25/89, now abandoned.

BACKGROUND OF THE INVENTION

This invention relates to data storage devices and more particularly to optical disk data storage devices. Even more particularly, the invention relates to an apparatus and method for restricting the writing of information on optical disk media.

An optical disk is a data storage medium which is readable by a laser-based reading device. Optical disks, known as "compact disks" or "CD's", have become increasingly popular during the last few years for recording music and audio-visual works. Due to the huge storage capacity of optical disks as compared to conventional magnetic storage media, optical disks known as "ROM disks" have become popular for storing computer readable information. Recent technology has produced optical disks which can be written as well as read by the computer, thus, in the future optical disks are expected to become increasingly more important in the computer industry and may eventually replace magnetically readable and writable storage media such as "floppy disks" and "hard disks". Optical disks of the type used in computer applications are generally mounted in cartridges, and the reading devices generally read or write data through a slot provided on a surface of the cartridge.

One type of optical disk is often called "WORM" disks for Write-Once-Read-Many. WORM media is a type that can be written but cannot be erased, therefore, it can be written only once. If an attempt is made to write on this media a second or subsequent times, the new data is written over the old data, resulting in garbled data which is unintelligible. A significant need exists for WORM media, however. This type of media is very useful for archive storage of data, wherein the data is intended to be written only once and never erased. A very significant aspect of WORM media, is that it always leaves an audit trail. Since it can only be written once, the data in a sector will always be the original data written in the sector. If a rewrite of the sector was attempted, it will be obvious from the garbled data and the CRC check data, which will be incorrect. In no case can the data in a sector be changed without leaving evidence of the change.

Recently a new type of optical disk media has been developed, called magneto-optic media or "MO" media. This type of media can be written, erased, and rewritten many times, in the same manner as magnetic media. Magneto-optic media is very important as a direct replacement for magnetic media, since it performs the same functions and allows a much larger storage capacity on a given disk.

Both types of media have important applications, however, it is very difficult and costly to design a single disk drive that can process both types of media. Therefore, if a computer needs to process both types of media two completely independent disk storage drives are needed.

There is a need then for a single media which can function either as WORM media, or as rewritable media. A similar problem has been addressed with magnetic media. Floppy disks for example, have a write protect notch which, if covered, prevents writing on the media. Therefore, a device can write on the media while the notch is uncovered, and then the notch can be covered to make the media "read-only". Magnetic tape has solved this problem in a similar way with a write ring, or in the case of tape cartridges with a record slide switch. These methods all suffer from the same drawback, that is, the mechanism is very easily reversed to make the media writable once again. In many operating systems, for example DOS on personal computers, a file can be marked as read-only after it has been initially written. Again, however, the read-only status is very temporary and can easily be reversed with another operating system command. Because the mechanism is easily reversed in all these cases, there is no audit trail.

This problem has also been partially addressed in a device, manufactured by Canon, Inc., called the "Canofile 250". This device allows an entire disk to be formatted as write-once. This device would appear to have a serious drawback, however, since the process of formatting a disk is usually done by an operation system within the computer. This means that the write-once format is known only to that operation system, and other operating systems, not knowing of this format, might write over the media, leaving no audit trail. Another problem with this device is that the write-once status only applies to the entire media, therefore the media cannot be divided into write-once and rewritable portions.

Another problem that exists in converting rewritable media to write-once media is that drives that were manufactured prior to the design of the convertible media will not understand that the media is convertible and may write on the media even though it has been marked as read-only. This problem is similar to the above described problem wherein the operating system simply sets a bit identifying a file as read-only. Because the previously manufactured drive is unaware of the mechanism by which the media is converted to read-only, it will ignore such mechanism and write on the media. Therefore, one of the most difficult problems being faced in providing a convertible media, is the problem of designing a mechanism which will be recognized by previously manufactured drives.

It is very desireable, then, to provide a system that will allow media to be converted from rewritable media to write-once media. Because the nature of its construction, WORM media is incapable of being written to more than once. Magneto-optic media, however, can be rewritten many times. Therefore, there is need in the art to provide apparatus and method for allowing magneto-optic media to be converted to write-once media. There is a further need in the art for allowing portions of the media to be converted to read-only, while retaining other portions of the media as rewritable. A still further need in the art is to allow each sector of the magneto-optic media to be independently converted to read-only. Yet another need in the art is to provide such an apparatus and method that prevents previously manufactured magneto-optic read/write drives from continuing to use the media as rewritable.

SUMMARY OF THE INVENTION

It is an object of the present invention to provide an apparatus and method of restricting the writing of data on optical media.

It is another object of the invention to provide such apparatus and method that prevents the media from being written by optical storage devices that were manufactured before such media was available.

It is another object of the present invention to provide apparatus and methods for defining writable media as read-only media.

Still another object of the invention is to provide apparatus and methods for defining portions of writable media as read-only media.

Yet another object of the invention is to provide apparatus and methods for dynamically changing a portion of the media from writable to read-only.

A further object of the invention is to provide apparatus and methods to define writable media wherein each data sector of such media can be redefined from writable to read-only.

The above an other objects of the invention are accomplished in a system wherein a media descriptor table, contained within a control track of the media, is modified to define the media as a new media type. All standard 5.25 inch optical disk media contains such a control track, which is defined by an ISO standard. By defining a new media type in the media descriptor table of the control track, previously manufactured drives will not recognize the media type, and therefore, will not read or write on the media. Because previously manufactured drives will not read or write on the media, they will not disturb the writable or read-only state of the media.

In addition to defining a new media type, the invention also defines a storage state bit within each sector of each track of the media. In a first embodiment, this bit defines whether the sector is writable or read-only. With this bit set into the writable state, the sector can be written many times. Once the bit is changed to read-only, however, the sector can no longer be written. The invention also defines that this bit may not be reset, once it is set into the read-only state. Therefore, the sector can be used many times until the storage state bit is once set into the read-only mode, and thereafter the sector must remain only in the read-only mode.

In a second embodiment, the storage state bit is used to indicate whether or not the sector has been written. Once data is written to the sector, the bit is set to indicate that the sector has been written, and the sector may not be written again. Thus, this second embodiment defines the media as write-once-read-many or WORM.

The invention defines two locations for the storage state bit. In one embodiment of the invention the storage state bit is located in the sector mark field area of each sector prior to the data portion of the sector. By placing the bit in the sector mark field, the drive will be able to write the bit and continue to write data on a single revolution.

In another embodiment of the invention, the storage state bit is placed in the data field area of each sector. By placing the bit in the data sector, no changes are required to the hardware of the drive, so this implementation can be performed completely within the drive firmware.

Using the above described apparatus and method, the invention provides the same level of security and auditability as current WORM drives. In addition, a drive containing the invention would be less expensive and simpler to design and manufacture than a drive that will accept either WORM or magnet-optic media.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

In general, the present invention provides an apparatus and method for allowing writable data storage media to be defined as read-only. In order to prevent previously manufactured data storage devices from writing on the media, the media is defined, using a control track, to be a new type of media. Therefore, previously manufactured drives, not recognizing the new type of media, will not write on it. Each sector of the new media type contains a storage state bit which defines whether the sector can be written to or is read-only. In a first embodiment, with this bit set in the writable state, the sector can be written to as many times as desired. Once the storage state bit has been change to the read-only state, the drive will no longer write data into this sector. The drive will not allow the bit to be changed from the read-only state back to the writable state.

In a second embodiment, the storage state bit is used to indicate whether or not the sector has been written. Once data is written to the sector, the bit is set to indicate that the sector has been written, and the sector may not be written again. Thus, this second embodiment defines the media as write-once-read-many or WORM.

Figure 1:
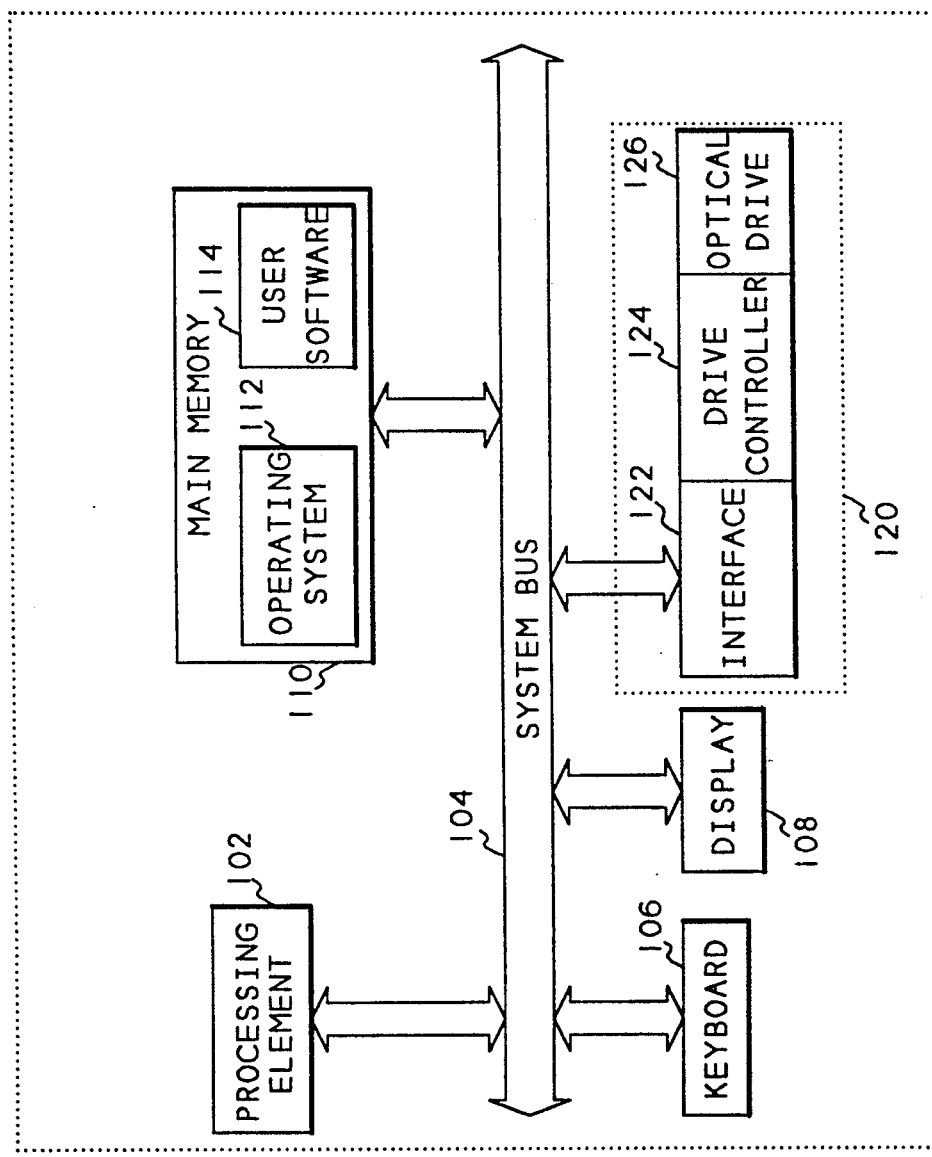
FIG. 1 is a block diagram of a computer system that incorporates the present invention.

FIG. 1 shows a block diagram of a computer system that incorporates the present invention. Referring now to FIG. 1, a computer system 100 is shown having a processing element 102. Data is transferred between the processing element 102 and all other parts of the system by a system bus 104. Attached to the system bus 104 is a keyboard 106 which allows a user to input data to the computer system 100. Also attached to the system bus 104 is a display 108 which allows the computer system 100 to display data to the user. A main memory 110 is attached to the system 104 and is used to store data and programs. Stored in the main memory 110 is an operating system 112 and user software 114. Also attached to the system bus 104 is the optical data storage device 120 of the present invention. Within the optical data storage device 120 is an interface 122 which connects the optical data storage device 120 to the system bus 104. Attached to the interface 122 is the drive controller 124 which contains all the electronics and firmware for controlling the optical drive 126.

Figure 2:
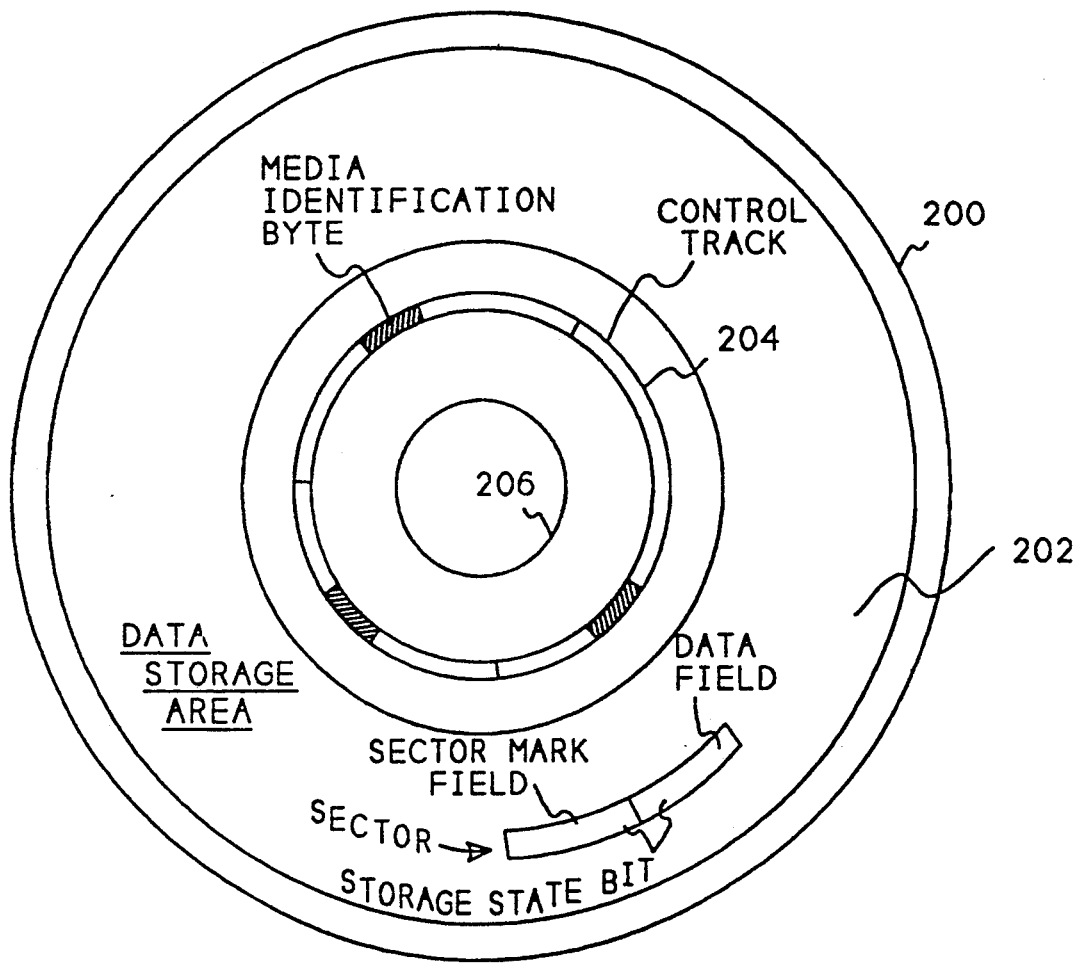
FIG. 2 is a diagram of an optical disk for use with the present invention.

FIG. 2 is a diagram of an optical disk storage media suitable for use with the present invention. Referring now to FIG. 2, disk 200 contains a data storage area 202 used to store user data in sectors. Outside the data storage area 202, and located toward the center of the disk 200, is a control track 204 which contains the media descriptor table of the present invention. A center hole 206 is used to center the media on the spindle of the optical drive 126 (FIG. 1). The disk 200 is typically surrounded by a cartridge (not shown) to protect the disk during storage. The data storage area 202 and the control track 204 are accessible through a slot in the cartridge.

Figure 3:
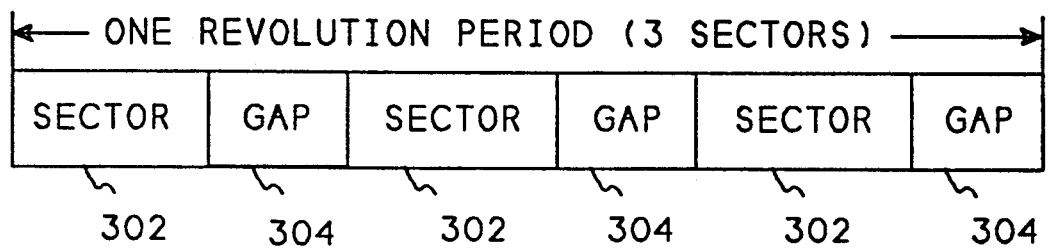
FIGS. 3 and 4 show the format of the control track of the disk of FIG. 2.

FIG. 3 is a description of the PEP zone of the control track 204 of FIG. 2. The PEP zone contains information that is intended to be easily readable by 5.25" Optical Drives conforming to all major 130 mm Optical Recording standards, regardless of capacity and recording technology. All information in this zone is prerecorded (embossed) and recorded in phase - encoded modulation. All marks are radially aligned and there are no grooves, thus eliminating the need for tracking while reading. The read back process necessary to retrieve this information is based on detecting differences in reflectance. The PEP Zone encodes information that is essential for the proper operation of the optical disk in a drive, including the physical organization of data, the optical characteristics of the disk, and the medium type, such as Rewritable or Write Once. Referring now to FIG. 3, the format of the control track 204 is shown having three identical sectors 302, each of which contains one hundred seventy-seven (177) bits of data. The sectors are called the media descriptor table. The sectors 302 are separated by a gap 304 which is of a length that would contain ten to twelve bits of data, however, the gap 304 is left unrecorded. The format of this control track is defined by International Standards Organization (ISO) standard 10089.

Figure 4:
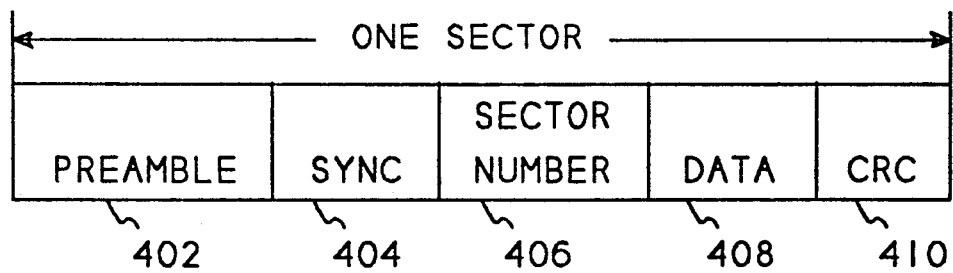

FIG. 4 is a diagram of one of the sectors 302 of FIG. 3. Referring now to FIG. 4, the sector is shown having a preamble 402 which is comprised of sixteen bits. The preamble 402 is followed by a sync area 404 which is one bit, and it is followed by a sector number 406 which is eight bits. The sector number 406 is followed by the data area 408 which is comprised of one hundred forty-four (144) bits, and the sector is completed with a CRC field 410 comprised of eight bits. The data field 408 is comprised of eighteen bytes of data, each of which contains eights bit. Byte seven of this data contains the media identification byte, which, in the present invention, identifies the media as both WORM and magneto-optic, to provide for the media being either type depending on the setting of the storage state bits.

The ISO standard defined above also defines the format of sector data within the media of the optical disk. Within this definition, each sector contains an ODF flag which is suitable for use in storing the storage state bit of the present invention. The ODF flag, also called the Offset Detection Flag, is a non-grooved area that contains no embossed data, and it is commonly called the mirror mark. The ODF is used as a reference for reflectance measurements on the disk and for calibration of the servos in the drive. For the second embodiment of the present invention, wherein the storage state bit is stored within the data portion of the each sector, the bit would be stored in any one of a set of 12 pointer bytes designated as P1.1, P1.2, P1.3, P1.4, P2.1, P2.2, P2.3, P2.4, P3.1, P3.2, P3.3, P3.4. Since these bytes are not used in the ISO standard, any one of the bits in these bytes can be used for the storage state bit.

In other embodiments, the storage state bits could be stored elsewhere on the media. For example, these bits could be stored together in a first area of the media, or they could be stored on a separate rewritable control track.

Figure 5:
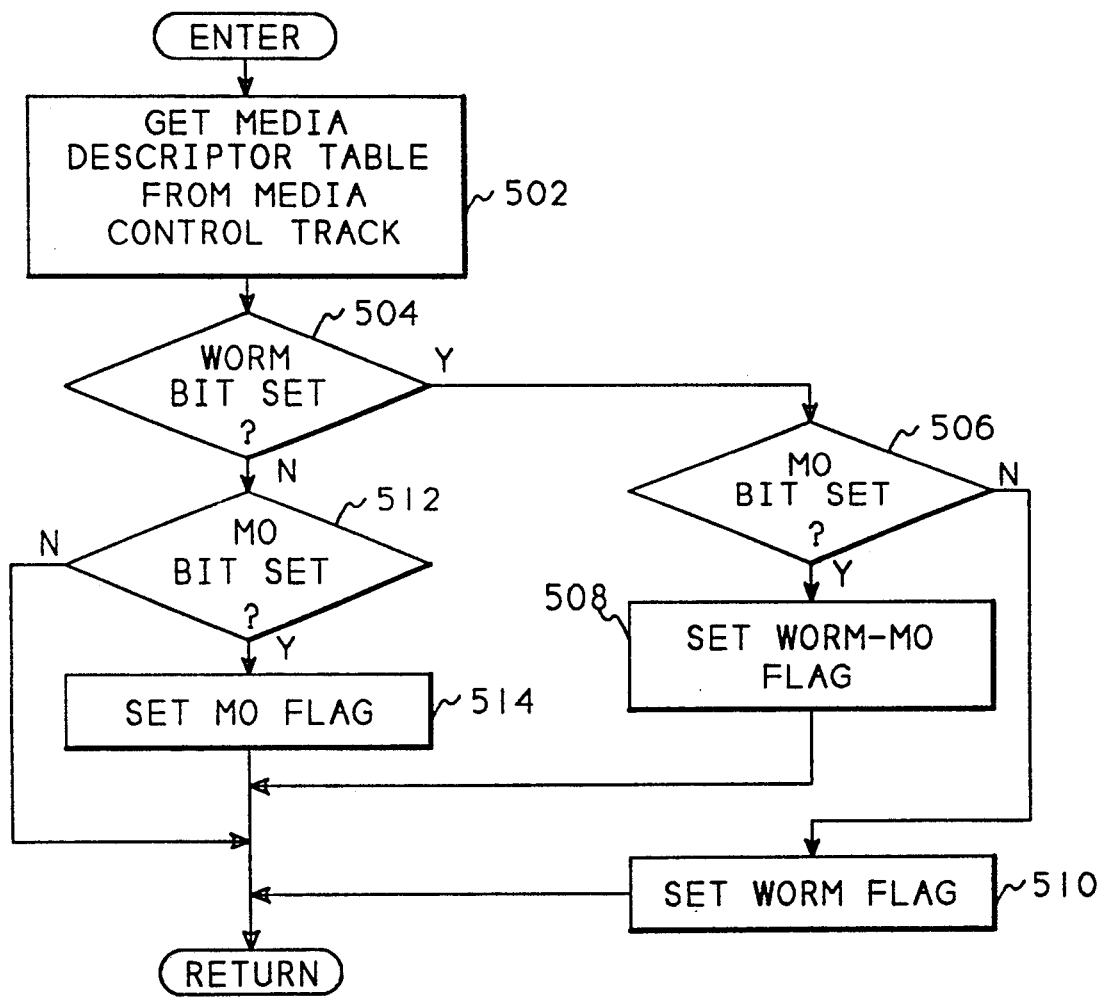
FIG. 5 is a flowchart of the process by which the firmware in the controller of the invention determines the media type.

FIG. 5 is a flowchart of the process used by the firmware within the drive controller 124 (FIG. 1) to determine the type of media that has been inserted into the optical drive 126 (FIG. 1). The process of FIG. 5 will be called by the firmware within the drive controller, after such firmware determines that new media has been inserted into the drive, and the media has been brought up to operational speed. Referring now to FIG. 5, after entry, block 502 reads the control track 204 (FIG. 2) from the media and extracts the media descriptor table from such control track. As described earlier, media suitable for use with the present invention will have both the WORM bit and the magneto-optic (MO) bits set in the media descriptor table. Any other unique combination of bits would also serve to identify the media as a new type suitable for use with the present invention. Block 504 checks byte seven of the media descriptor table, to determine if the WORM bit is set. If the WORM bit is set, block 504 transfers to block 506 which determines whether the magneto-optic bit has been set. If the magneto-optic bit has been set, block 506 transfers to block 508 which sets a flag indicating that the media is identified as both WORM and magneto-optic, and therefore is suitable for use with the present invention. Block 508 then returns to the caller. If the magneto-optic bit was not set, block 506 transfers to block 510 which sets a flag indicating that the media should be treated as WORM media. Therefore, the optical drive 126 will not write on the media, but instead will treat the entire media as read-only. Block 510 then returns to the caller.

If block 504 determined that the WORM bit was not set, block 504 transfers to block 512 which checks the magneto-optic bit. If the MO flag is set, block 512 transfers to block 514 which sets the magneto-optic flag. With the magneto-optic flag set, the optical drive 126 will treat the entire media as if it is writable and will not look for storage state bits within the sectors of the media. After setting the MO flag, block 514 returns to the caller. If block 512 determines that the magneto-optic bit is not set, block 512 returns to the caller without setting any flags. With no flags set, the optical drive 126 will eject the media as not suitable for its use.

Figure 6:
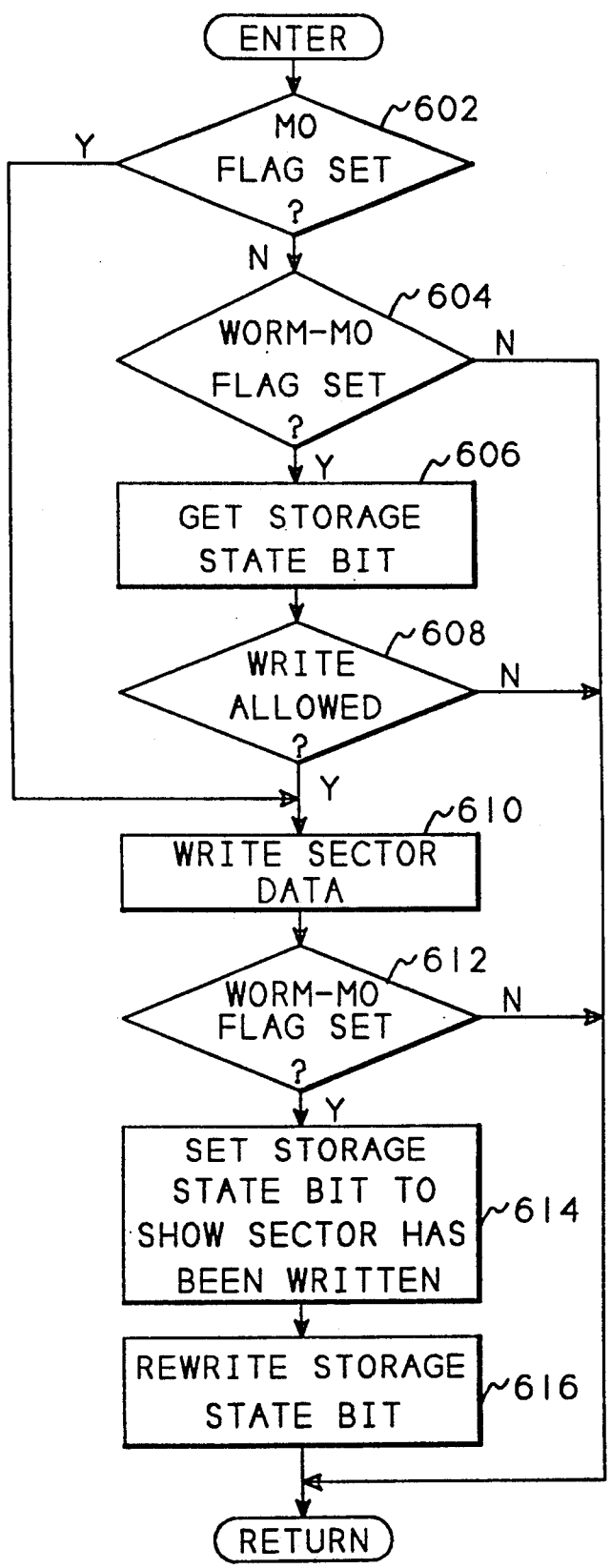
FIG. 6 is a flowchart of the process of writing a data sector in the present invention.

FIG. 6 is flowchart of the process of writing a sector in the present invention. Referring now to FIG. 6, after entry, block 602 determines whether the magneto-optic flag is set. If the magneto-optic flag is set, any sector on the media can be written at any time, therefore, block 602 transfers directly to block 610 to write the sector. If the magneto-optic flag is not set, block 602 transfers to block 604 which checks the WORM-MO flag to see if it is set. If the WORM-MO flag is not set, this media is not suitable to written on, therefore, block 604 returns to the caller. If the WORM-MO flag is set, block 604 transfers to block 606 to get the rewritable flag from either the sector flag area or the data area of the sector depending on the embodiment being used. Block 608 then checks this flag to see if writing is allowed. If writing is not allowed, block 608 returns to the caller. If writing is allowed, block 608 transfers to block 610 which writes the data in the sector. Block 612 then checks the WORM-MO flag again because both magneto-optic media and WORM-MO media will cause the process to pass through block 610. If the WORM-MO flag is not set, block 612 simply returns to user because this is magneto-optic media. If the WORM-MO flag is set, block 612 transfers to block 614 to set the storage state bit to show that the sector is now read-only. Block 616 then rewrites the rewritable flag onto the media and returns to the caller.

Although the process of FIG. 6 allows a sector to be written only once, the process could be defined to allow writing of a sector many times, until a "change-state" command is received for the sector. This command would change the storage state bit to read-only and, thereafter, the drive would not write data into the sector. The change-state command would not change the storage state from read-only to writable.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A system for using a control track on a rewritable data storage media, said control track being defined by International Standards Organization Standard Number 10089, to define said rewritable data storage media as a write-once data storage media, and for storing data thereon, said system comprising:

a data storage device for reading and writing said data;

rewritable data storage media disposed within said data storage device for storing said data;

means contained in a media identification byte of said control track of said rewritable data storage media for defining said rewritable data storage media as a media type having a rewritable-write-once storage state;

storage data bit means contained in said rewritable data storage media for defining a portion storage state for each of a plurality of predefined portions of said data storage media;

means within said data storage device for changing said portion storage state from writable to read-only;

means within said data storage device for preventing writing to any one of said plurality of predefined portions of said rewritable data storage media if said control track indicates that said rewritable data storage media has said rewritable-write-once storage state and if said portion storage state indicates that said portion has been changed from writable to read-only; and means within said data storage device for preventing said portion storage state from being changed from read-only to writable.

2. The system of claim 1 further comprising means for changing said portion storage state to read-only when said portion is first written.

3. The system of claim 1 wherein said plurality of predefined portions of said data storage media comprise data storage sectors.

4. The system of claim 3 wherein said means for defining said portion storage state comprises a bit in a sector mark field of said data storage sectors.

5. The system of claim 3 wherein said means for defining said portion storage state comprises a bit in a data field of said data storage sectors.

6. The system of claim 1 wherein said means for defining said rewritable data storage media format comprises a predefined bit in said control track of said rewritable data storage media.

7. A process for defining a rewritable media, said media being defined by International Standards Organization Standard Number 10089, as write-once using a control track, said control track being defined in said Standard Number 10089, and for storing data thereon, said process comprising the steps of:

(a) defining a rewritable-write-once media type in a media identification byte of said control track of said media;

(b) subdividing said rewritable-write-once media into a plurality of portions, each of said portions being definable as write-once;

(c) defining a storage state bit for each of said portions;

(d) examining said media type and said storage state bit prior to a write operation to one of said subdivided portions;

(e) when said media type indicates that the media is rewritable-write-once media, and when said storage state bit also indicates that said portion has already had data stored thereon, canceling said write operation; and (f) when said media type indicates that the media is rewritable-write-once media, and when said storage state bit also indicates that said portion has not had data stored thereon, proceeding with said write operation, and after said write operation is complete, setting said storage state bit to indicate that data has been stored thereon.

8. The process of claim 7 wherein step (b) further comprises the step of:

(b1) defining said portions as sectors within said media.

9. The process of claim 8 wherein step (c) further comprises the step of:

(c1) defining said storage state bit in a sector mark field in said sector.

10. The process of claim 8 wherein step (c) further comprises the step of:

(c1) defining said storage state bit in a data field in said sector.

* * * * *